US007869623B2

(12) United States Patent
Schaede

(10) Patent No.: US 7,869,623 B2
(45) Date of Patent: Jan. 11, 2011

(54) INSPECTION MACHINE AND PROCESS

(75) Inventor: Johannes Georg Schaede, Würzburg (DE)

(73) Assignee: KBA-Giori S.A., Lausanne (CH)

( * ) Notice: Subject to any disclaimer, the term of this patent is extended or adjusted under 35 U.S.C. 154(b) by 1089 days.

(21) Appl. No.: 10/594,296

(22) PCT Filed: Apr. 15, 2005

(86) PCT No.: PCT/IB2005/001060

§ 371 (c)(1),
(2), (4) Date: Sep. 27, 2006

(87) PCT Pub. No.: WO2005/104045

PCT Pub. Date: Nov. 3, 2005

(65) Prior Publication Data

US 2007/0274567 A1 Nov. 29, 2007

(30) Foreign Application Priority Data

Apr. 22, 2004 (EP) .................................. 04009513

(51) Int. Cl.
*G06K 9/00* (2006.01)

(52) U.S. Cl. ....................... 382/112; 382/141; 382/145; 250/372; 250/461

(58) Field of Classification Search ................. 382/112, 382/141, 145; 250/372, 461, 559, 571; 356/71, 356/239.1
See application file for complete search history.

(56) References Cited

U.S. PATENT DOCUMENTS 4,561,103 A 12/1985 Horiguchi et al.
4,630,813 A * 12/1986 Watanabe et al. ........... 271/227
5,530,562 A 6/1996 Eisenbarth et al.
5,592,573 A 1/1997 Eisenbarth et al.
5,598,006 A 1/1997 Stringa
6,301,374 B1 10/2001 Stringa
7,096,784 B2 8/2006 Giori et al.
7,185,749 B2 * 3/2007 Armanini et al. ............ 194/302
7,423,738 B2 * 9/2008 De Toni et al. ................ 356/71
2003/0107004 A1 * 6/2003 Leach et al. ................ 250/372
2004/0026851 A1 2/2004 Schaede et al.
2005/0052711 A1 3/2005 Schaede
2006/0011447 A1 1/2006 Hornung et al.
2006/0038340 A1 2/2006 Schinzel-Reiner et al.
2006/0208412 A1 9/2006 Reinhard et al.
2006/0213384 A1 9/2006 Reinhard et al.

(Continued)

FOREIGN PATENT DOCUMENTS

DE 32 48 928 C2 7/1983

(Continued)

*Primary Examiner*—Samir A. Ahmed
*Assistant Examiner*—Ali Bayat
(74) *Attorney, Agent, or Firm*—Seager, Tufte & Wickhem, LLC

(57) ABSTRACT

The machine comprises at least a first sheet inspection unit with an inspection cylinder for transporting a printed sheet during inspection, an illumination means and a camera connected to an analysing device, an input transfer cylinder to bring the printed sheet to the at least one inspection unit and an output transfer cylinder to take away the printed sheet from the at least one inspection unit. The inspection unit and the transfer cylinders are arranged in such a manner that the output transfer cylinder takes away the inspected printed sheet only once the inspection is completed.

19 Claims, 2 Drawing Sheets

U.S. PATENT DOCUMENTS

2007/0027818 A1 * 2/2007 Lofgren et al. ................ 705/65

FOREIGN PATENT DOCUMENTS

| | | | | |
|---|---|---|---|---|
| DE | 41 03 832 | A1 | | 8/1992 |
| DE | 196 04 856 | A1 | | 8/1997 |
| DE | 102 31 409 | A1 | | 1/2004 |
| DE | 102 36 028 | A1 | | 2/2004 |
| EP | 0 582 547 | A1 | | 2/1994 |
| EP | 0 582 548 | A1 | | 2/1994 |
| EP | 0 582 546 | B1 | | 3/1994 |
| EP | 0 612 042 | B1 | | 8/1994 |
| EP | 0 668 577 | A1 | | 8/1995 |
| EP | 0 734 863 | B1 | | 10/1996 |
| EP | 0 796 735 | A1 | | 9/1997 |
| GB | 2023547 | A | | 1/1980 |
| JP | 61-175552 | | * | 8/1986 |
| JP | 61-175552 | A | | 8/1986 |
| JP | 2000-85095 | A | | 3/2000 |
| WO | WO 00/13128 | A1 | | 3/2000 |
| WO | WO 01/85457 | A1 | | 11/2001 |
| WO | WO 01/85586 | A1 | | 11/2001 |

* cited by examiner

INSPECTION MACHINE AND PROCESS

FIELD

The present invention concerns an inspection machine for printed matter in the form of printed sheets, such as securities, notes, banknotes, passports and other similar documents.

The present invention also concerns an inspection process for printed matter in the form of printed sheets, such as securities, notes, banknotes, passports and other similar documents.

BACKGROUND

In the field of securities, i.e. banknotes, passports and other similar documents, it is well known to use security features for protecting said documents against forgery. In this field, it is also necessary to produce printed documents with high quality in order to distinguish real printed documents and securities from fake.

Accordingly, the inspection of said printed matter must be carried out in a precise manner with high quality standards to accept only printed documents that fulfil the quality criteria and reject misprinted documents or documents that does not meet the preset quality criteria.

Known inspection machines and quality control machines for printed matter such as securities include (for example) WO 01/85586, WO 01/85457, EP 0 796 735, EP 0 668 577, EP 0 734 863, EP 0 612 042, EP 0 582 548, EP 0 582 547 and EP 0 582 546, the content of which is incorporated by reference in the present application.

SUMMARY

It is an aim of the present invention to improve the known inspection machines and processes.

In particular, it is an aim of the present invention to provide an inspection machine and process which optimises the transport and inspection times required for performing inspection of printed sheets.

Another aim of the present invention is to make it possible to build an inspection machine with a compact configuration.

It is a further aim of the present invention to provide a simple and reliable inspection machine and process.

To this effect, the invention complies with the definition of the claims.

BRIEF DESCRIPTION

The invention will be best understood with reference to drawings in which

DETAILED DESCRIPTION

Figure 1:
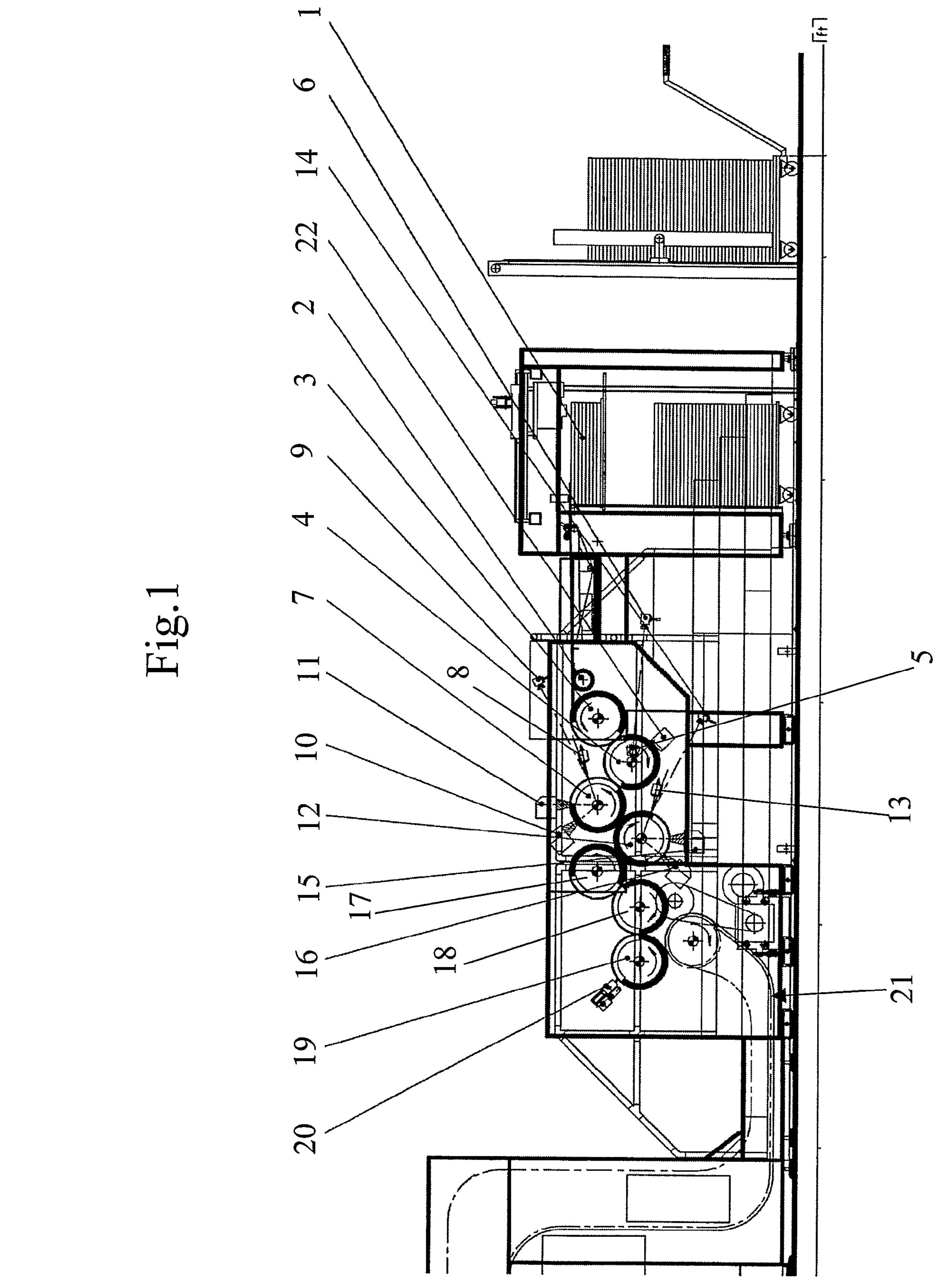
FIG. 1 shows an embodiment of the inspection machine according to the invention.

In FIG. 1, an inspection machine is disclosed which comprises a sheet feeder 1 which transfers successive sheets in the inspection machine in a manner known in the art. The incoming successive sheets are transferred by a suction stop drum 2 to a transfer cylinder 3. Preferably, the successive sheets are held on said transfer cylinder by gripper means placed in a pit of the cylinder, in a manner known in the art.

From the transfer cylinder 3, the successive sheets are taken over by a first inspection unit. This inspection unit is made of a transparent cylinder 4 in which an illumination lamp 5 is placed to illuminate in transparency the sheet carried by the transparent cylinder 4. As is known in the art, the successive sheets are held on said cylinder 4 by gripper means placed in a pit of the cylinder. A camera 6, for example a CCD camera known per se in the art, takes the image created by this illumination.

This image is a transparency image of the printed sheet since the cylinder is transparent and is used to check the position and quality of the features only visible in transparency, for example watermarks. To this effect, the image taken is transferred to a computer device (not shown) with appropriate programs to analyse the data (see for example the above-cited prior art references) and generate a result of the inspection.

The transparent cylinder 4 is made, for example, of plexiglas or other similar suitable material. Since this cylinder is non-metallic, it is possible to control the magnetic properties of the printed sheet, with a magnetic detector 22.

Once this first inspection by transparency has been carried out, the sheet is transferred to a second inspection unit formed by a second inspection cylinder 7 (in direct contact with the first inspection cylinder 4) with a second illuminating means 8, such as a lamp, and a second camera 9. As is known in the art, the successive sheets are held on said cylinder 7 by gripper means placed in a pit of the cylinder. This second inspection unit takes a picture of one side of the sheet on cylinder 7, for example the recto side of the sheet, and is used to control the print quality of said side of the sheet by appropriate computer devices and programs, as is known in the art. For example, this unit could control the register of the securities, banknotes, the colors etc. as is standard in the art (see for example as disclosed in the above-mentioned prior art documents incorporated by reference) and generate a result of this inspection.

This second inspection unit may comprise, in addition, second additional inspection devices referenced 10 and 11 in FIG. 1 to inspect and check the presence of features, which are not visible such as IR, UV, magnetic features etc. on the sheets. These devices thus may comprise appropriate lamps (UV) and detectors (IR, magnetic) to carry out said additional inspection.

After this second inspection, the inspected sheet is then transferred to a third inspection unit formed by a third inspection cylinder 12 (in direct contact with the second inspection cylinder 7) with a third illuminating means 13, such as a lamp, and a third camera 14. As is known in the art, the successive sheets are held on said cylinder 12 by gripper means placed in a pit of the cylinder. This third inspection unit is similar to the second inspection unit but takes a picture of the other side of the sheet on cylinder 12, for example the verso side of the sheet if the second unit inspected the recto side, and is used to control the print quality of said verso side of the sheet by appropriate computer devices and programs, as is known in the art. For example, this third unit, as the second unit, could control the register of the securities, banknotes, the colors etc. as is standard in the art (see for example as disclosed in the above-mentioned prior art documents incorporated by reference) with known appropriate devices (computer, programs etc) and generate a result of this inspection.

This third inspection unit may comprise, in addition and similarly to the second inspection unit described above, third additional inspection devices referenced 15 and 16 in FIG. 1 to inspect and check the presence of features, which are not visible such as IR, UV, magnetic features etc. on the sheets. Accordingly, these additional devices may comprise appropriate lamps (UV) and detectors (IR, magnetic) to carry out said additional inspection.

Once this third inspection is terminated, the sheet inspected is transferred via second 17 and third 18 transfer cylinder to a marking unit to be marked if the inspection has detected a sheet with defects. The marking unit comprises a marking cylinder 19 and a marking device 20. After the marking unit, the sheet is taken away by a chain gripper transport system 21, known per se in the art of printing machines, and is delivered in a pile delivery system. Preferably, the sheets are sorted in this delivery system, i.e. the defective (marked) sheets are put in a defective pile and the sheets with no defects are put in another pile. As is known in the art, the successive sheets are held on said transfer cylinders 17 and 18 by gripper means placed in a pit of the cylinders.

Preferably, the cameras used are linear CCD cameras that take successive linear images of the sheet being inspected. Therefore, in order to be able to take the proper image of the entire sheet being inspected, they are synchronized with the sheet transport on the cylinders 4, 7 and 12 through an encoder of said cylinders. In order to have a perfect match between the encoder reading of each cylinder 4, 7 and 12 and camera image taking, the sheet must be completely inspected before they are transferred to the next inspection cylinder. The relative position of the cylinders must be such that this condition of complete inspection before transfer is maintained. In this case, the sheets can be properly inspected and the transfer operation from one cylinder to another does not influence the inspection operation per se.

Preferably, the transfer and inspection cylinders 3,4,7,12, 17 are arranged in a zigzag manner, as shown in FIG. 1, such that a transport length of a printed sheet on each inspection cylinder, between an input location where a printed sheet is transferred onto the inspection cylinder and an output location where the printed sheet is transferred away from the inspection cylinder is optimised for a given sheet length. In particular, the transport length of the printed sheet on the inspection cylinder between the input and output locations is selected to be slightly greater than the length of the printed sheet to be inspected. It will be understood that this configuration allows to reduce to a minimum the overall transport path of the sheets through the inspection units, thereby minimizing the transport and inspection times of the sheets. Indeed, with the machine configuration illustrated in FIG. 1, the transport length between the input location on the first inspection cylinder 4 and the output location of the third inspection cylinder 12 is slightly greater than three times the length of the inspected sheets. Combined with cylinders of minimal size, this further allows to build a machine with a very compact configuration.

Preferably, as shown in FIG. 1 by way of a non-limiting but advantageous example, the cylinders are dimensioned to carry one single sheet to be inspected. Of course, other configurations could be envisaged in which two or three sheets are carried by each cylinder.

Preferably, the transfer and inspection cylinders are carrying only one set of grippers each (each cylinder being thus adapted to transport one sheet at a time), and the diameter of the cylinders is minimized for minimal transport and inspection time while maintaining the conditions defined of transfer only once the inspection is finished. In the machine configuration shown in FIG. 1, the transfer cylinders 3, 17 and the inspection cylinders 4, 7, 12 advantageously have the same diameters.

Figure 2:
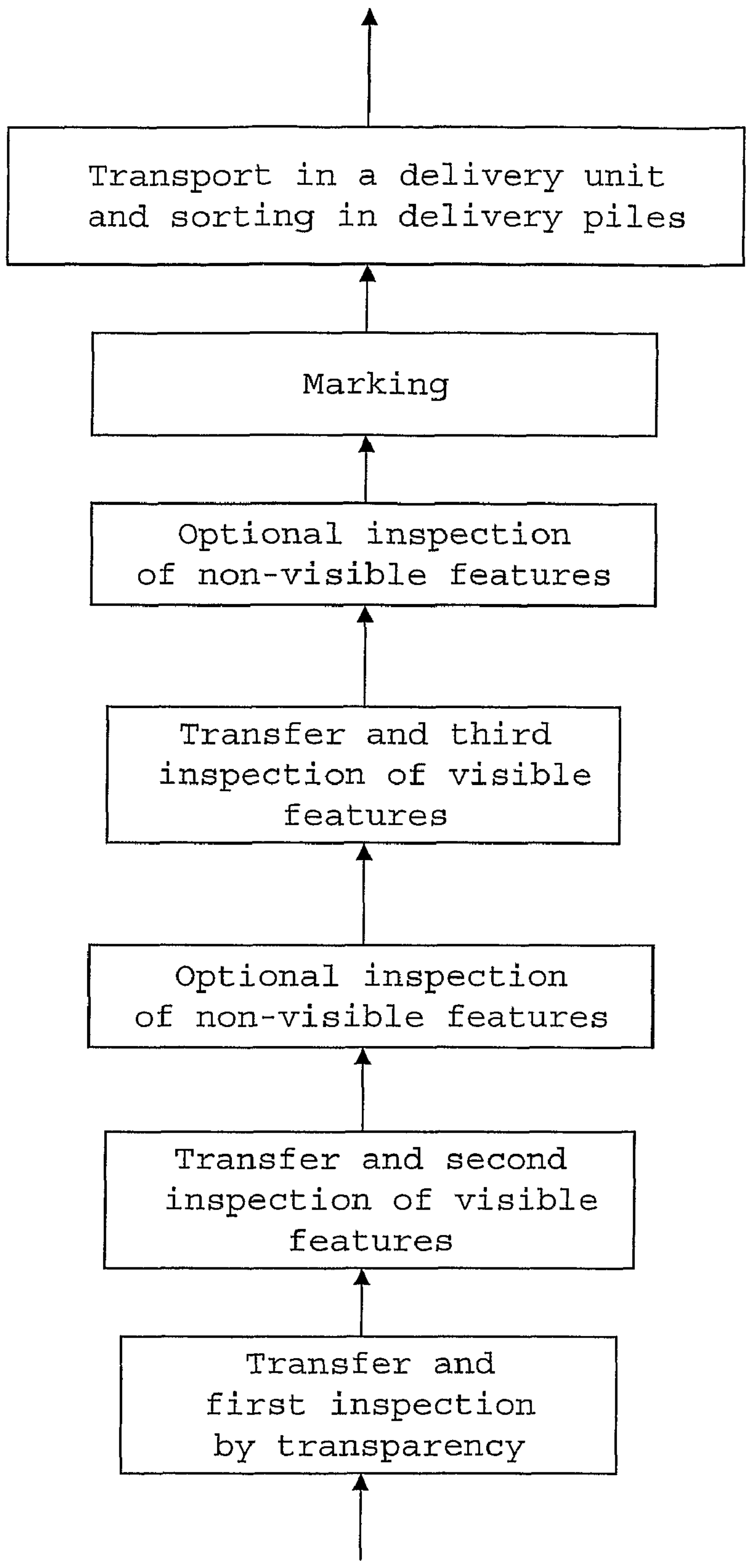
FIG. 2 shows a block-diagram of an inspection process according to the invention.

In FIG. 2 a block-diagram of an inspection process is disclosed.

In a first step, the successive sheets to be inspected are transferred from the feeder into a first inspection unit in which the inspection by transparency is carried out.

Then, once this inspection has been done, the sheets are transferred to a second inspection unit in which a second inspection is carried out, for example on a recto side of the sheets. In this second inspection unit, it is possible to control visible features of the printing (ink, colors, registration) and non-visible features (IR, V, magnetic properties).

After this second inspection is terminated, the sheets are transferred to a third inspection unit similar to the second inspection unit but it is the other side (for example the verso side) of the sheets that is inspected in a similar manner, i.e. the visible and non-visible features are controlled.

Once this third inspection is terminated, the sheets inspected are transferred in a marking unit and are marked if the result of one of the inspection is a fail (that is the sheet has a defect).

Finally, the sheets are transported in a delivery unit and sorted in delivery piles (with or without defect) which then can be used for further processing of the inspected sheets.

Of course, in the machine of FIG. 1, the respective positions of the different inspections unit may be varied and it is possible to first inspect a side of the sheets (recto or verso), then another side (verso or recto) and then to carry out the transparency inspection.

The invention claimed is:

1. Inspection machine for printed matter in the form of printed sheets, comprising:

a sheet feeder, a first sheet inspection unit with a first inspection cylinder for transporting a printed sheet during inspection, a first illumination means and a first camera connected to an analysing device for taking an image of the printed sheet while it is transported on the first inspection cylinder, a second sheet inspection unit with a second inspection cylinder for transporting a printed sheet during inspection, a second illumination means and a second camera connected to the analysing device for taking an image of the printed sheet while it is transported on the second inspection cylinder, a third sheet inspection unit with a third inspection cylinder for transporting a printed sheet during inspection, a third illumination means and a third camera connected to an analysing device for taking an image of the printed sheet while it is transported on the third inspection cylinder, an input transfer cylinder to successively bring the printed sheets to the first inspection unit, and an output transfer cylinder to take away the printed sheets from the third inspection unit, wherein the input transfer cylinder, the first, second and third inspection cylinders and the output transfer cylinder are disposed one after the other in direct contact so that a printed sheet is transferred directly and successively from the input transfer cylinder to the first inspection cylinder, to the second inspection cylinder, to the third inspection cylinder, and to the output transfer cylinder, and wherein the first, second and third inspection units and the input and output transfer cylinders are arranged in such a manner that the printed sheet is transferred directly from one transfer or inspection cylinder to another and that the inspected printed sheet is taken away from the first, second or third inspection cylinder only once the inspection of the sheet is completed by the first, second or third inspection unit.

2. A machine as claimed in claim 1, wherein the first inspection cylinder is a transparent cylinder, the first illuminating means are placed inside the transparent cylinder and the first camera is placed outside the transparent cylinder for inspecting a printed sheet in transparency.

3. A machine as claimed in claim 1, wherein the second sheet inspection unit inspects a first illuminated side of the printed sheet.

4. A machine as claimed in claim 1, wherein the third sheet inspection unit inspects a second illuminated side of the printed sheet.

5. A machine as claimed in claim 1, wherein the second inspection unit and the third inspection unit each further include at least one non-visible feature inspection unit.

6. A machine as claimed in claim 5, wherein the non-visible feature inspection unit includes means for detecting IR, UV or magnetic properties on the printed sheets.

7. A machine as claimed in claim 1, wherein the first, second and third inspection cylinders are carrying only one set of grippers each, and the diameter of the first, second and third inspection cylinders is minimized for minimal transport and inspection time.

8. A machine as claimed in claim 1, wherein the input transfer cylinder, the first second and third inspection cylinders, and the output transfer cylinder are arranged in a zigzag manner such that a transport length of a printed sheet on each of the first, second and third inspection cylinders, between an input location where a printed sheet is transferred onto the first, second or third inspection cylinder and an output location where the printed sheet is transferred away from the first, second or third inspection cylinder is optimised for a given sheet length.

9. A machine as claimed in claim 8, wherein the transport length of the printed sheet on the first, second or third inspection cylinder is slightly greater than the length of the printed sheet to be inspected.

10. A machine as claimed in claim 1, further comprising a marking unit placed downstream of the output transfer cylinder for marking defective sheets.

11. A machine as claimed in claim 1, wherein each of the first, second and third cameras is a linear camera that takes successive linear images of the printed sheet being inspected and which is synchronized with the sheet transport on the associated first, second or third inspection cylinder.

12. A machine as claimed in claim 11, wherein each of the first, second and third inspection cylinder comprises an encoder for synchronizing operation of the associated linear camera.

13. An inspection process for printed matter in the form of printed sheets, wherein the process comprises the following steps:

successive printed sheets to be inspected are transferred from a feeder to a first inspection unit in which a first inspection by transparency is carried out, the printed sheets being transported in the first inspection unit by a first inspection cylinder;

once the first inspection is terminated, the printed sheets are transferred to a second inspection unit in which a second inspection of a first side of the printed sheets is carried out, the printed sheets being transported in the second inspection unit by a second inspection cylinder;

once the second inspection is terminated, the printed sheets are transferred to a third inspection unit in which a third inspection of a second side of the printed sheets is carried out, the printed sheets being transported in the third inspection unit by a third inspection cylinder;

once the third inspection is terminated, the printed sheets are transferred to a marking unit and are marked as defective if the result of one of the first, second and third inspections shows a defect; and once marking has been performed, the printed sheets are transported in a delivery unit and sorted in delivery piles depending on whether or not the printed sheet are marked as being defective, wherein transfer of the printed sheets from the first inspection unit to the second inspection unit, and from the second inspection unit to the third inspection unit, is made directly from the first inspection cylinder to the second inspection cylinder, respectively from the second inspection cylinder to the third inspection cylinder.

14. An inspection process according to claim 13, wherein the second or third inspection includes inspection of visible features on the printed sheets.

15. An inspection process as claimed in claim 13, wherein the diameter of the first, second and third inspection cylinders is minimized for minimal transport and inspection time.

16. An inspection process as claimed in claim 13, comprising the step of arranging the first, second and third inspection cylinders in such a manner that a transport length of a printed sheet on each inspection cylinder, between an input location where a printed sheet is transferred onto the inspection cylinder and an output location where the printed sheet is transferred away from the inspection cylinder is optimised for a given sheet length.

17. An inspection process as claimed in claim 16, wherein the transport length of the printed sheet on each of the first, second and third inspection cylinders is selected to be slightly greater than the length of the printed sheet to be inspected.

18. An inspection process as claimed in claim 13, wherein the first, second and third inspections include synchronizing operation of a linear camera that takes successive linear images of the printed sheet being inspected with the sheet transport on the associated first, second and third inspection cylinder.

19. An inspection process according to claim 13, wherein the second or third inspection includes inspection of invisible features on the printed sheets.

* * * * *

UNITED STATES PATENT AND TRADEMARK OFFICE

CERTIFICATE OF CORRECTION

PATENT NO. : 7,869,623 B2
APPLICATION NO. : 10/594296
DATED : January 11, 2011
INVENTOR(S) : Johannes Georg Schaede It is certified that error appears in the above-identified patent and that said Letters Patent is hereby corrected as shown below:

Column 4
Line 6: delete “V” and insert therefor -- UV --.

Signed and Sealed this
Twenty-second Day of March, 2011

David J. Kappos
*Director of the United States Patent and Trademark Office*